(12) United States Patent
Simpson et al.

(10) Patent No.: US 6,705,118 B2
(45) Date of Patent: *Mar. 16, 2004

(54) METHOD OF BOOSTING A GLASS MELTING FURNACE USING A ROOF MOUNTED OXYGEN-FUEL BURNER

(75) Inventors: Neil George Simpson, Sylvania, OH (US); Greg Floyd Prusia, Holland, OH (US); Stephen McDonald Carney, Maumee, OH (US); Thomas G. Clayton, Toledo, OH (US); Andrew Peter Richardson, Clinton, NJ (US); John R. LeBlanc, Perrysburg, OH (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/117,898

(22) Filed: Apr. 8, 2002

(65) Prior Publication Data

US 2002/0144518 A1 Oct. 10, 2002

Related U.S. Application Data

(63) Continuation of application No. 09/374,921, filed on Aug. 16, 1999, now Pat. No. 6,422,041.

(51) Int. Cl.$^7$ ............................. C03B 5/16; C03B 5/237

(52) U.S. Cl. .................... 65/134.4; 65/134.6; 65/136.3; 65/356; 432/10; 432/20; 432/94

(58) Field of Search .................... 65/134.1, 134.4, 65/134.5, 134.6, 135.1, 135.2, 135.8, 136.1, 136.2, 136.3, 335, 347, 355, 356; 432/20, 31, 159, 10, 182; 110/331–335; 431/8, 10

(56) References Cited

U.S. PATENT DOCUMENTS

| | | | |
|---|---|---|---|
| 3,337,324 | A | 8/1967 | Cable et al. |
| 4,297,093 | A | 10/1981 | Morimoto et al. |
| 4,473,388 | A | 9/1984 | Lauwers |
| 4,531,960 | A | 7/1985 | Desprez |
| 4,539,035 | A | 9/1985 | Burckhardt et al. |
| 4,565,560 | A | 1/1986 | Krumwiede et al. |
| 4,816,056 | A | 3/1989 | Tsai et al. |
| 5,085,156 | A | 2/1992 | Dykema |
| 5,116,399 | A | 5/1992 | Lauwers |

(List continued on next page.)

FOREIGN PATENT DOCUMENTS

| | | |
|---|---|---|
| DE | 2 015 597 | 4/1970 |
| EP | 0 754 912 A2 | 1/1997 |
| EP | 1 078 892 A2 | 2/2001 |
| EP | 1 136 451 A2 | 9/2001 |
| EP | 00 30 6970 | 12/2002 |
| EP | 02 25 1476 | 12/2002 |
| WO | WO 99/31021 | 6/1999 |

OTHER PUBLICATIONS

McMahon et al, Can Partial Conversion to Oxy–Fuel Combustion Be a Solution to Furnace Problems? In Glass Industry pp 23–24, Dec. 1994.*

Primary Examiner—Steven P. Griffin
Assistant Examiner—Eric Hug
(74) Attorney, Agent, or Firm—Joshua L. Cohen (57) ABSTRACT

In an industrial glass furnace which contains recuperators, regenerators, electric boost or other devices for providing heat to glass batch material an oxy-fuel burner mounted in the roof of the furnace provides additional heat to melt the batch material. A method of mounting and using such a roof-mounted oxy-fuel burner including the operating parameters to maximize heat transfer while minimizing the disturbance of the batch material is disclosed.

18 Claims, 8 Drawing Sheets

U.S. PATENT DOCUMENTS

| | | |
|---|---|---|
| 5,139,558 A | 8/1992 | Lauwers |
| 5,203,859 A | 4/1993 | Khinkis et al. |
| 5,215,455 A | 6/1993 | Dykema |
| 5,454,712 A | 10/1995 | Yap |
| 5,458,483 A | 10/1995 | Taylor |
| 5,755,818 A | 5/1998 | Tuson et al. |
| 5,924,858 A | 7/1999 | Tuson et al. |
| 6,041,622 A | 3/2000 | Duchateau et al. |
| 6,237,369 B1 | 5/2001 | LeBlanc et al. |
| 6,250,915 B1 | 6/2001 | Satchell et al. |
| 6,422,041 B1 * | 7/2002 | Simpson et al. ............ 65/134.4 |
| 6,519,973 B1 * | 2/2003 | Hoke et al. ................. 65/134.4 |

* cited by examiner

METHOD OF BOOSTING A GLASS MELTING FURNACE USING A ROOF MOUNTED OXYGEN-FUEL BURNER

CROSS REFERENCE TO RELATED APPLICATIONS

This application is a continuation of U.S. Ser. No. 09/374,921 filed Aug. 16, 1999 now U.S. Pat. No. 6,422,041.

BACKGROUND OF THE INVENTION

This invention relates to the use of at least one oxygen-fuel burner in the roof of a glass melting furnace to boost production capacity or maintain current production capacity with either reduction of electro-boost or as a result of deterioration of existing heat recovery equipment such as recuperators or regenerators. The process involves the replacement of a portion of existing or previously existing air-fuel or electrical energy capacity with oxy-fuel energy. With the exception of end-fired regenerative furnaces and electric furnaces the process involves the blocking of regenerative ports or isolation of recuperative burners. In particular the design selection, angling and positioning of the burners over the raw batch materials entering the furnace improves the rate of melting, increase product yield, better energy efficiency and improve glass quality. Accurate control of the stoichiometric ratio of combustion in the burner, rich lean interaction of burners and furnace zonal fuel/oxygen staging are used to optimise heat transfer while minimizing oxides of nitrogen and sulfur dioxide emissions.

Regenerative, recuperative, electric and direct fired furnaces have been commonly involved in the manufacture of glass and related frit products.

Air-fuel regenerative furnaces fall into two categories: cross-fired and end-fired. Cross-fired regenerative furnaces have multiple ports typically three to eight on each side of the furnace that connect to either a common or compartmentalized regenerator to preheat the combustion air. The regenerators which come in various shapes and sizes reverse every 15–30 minutes dependent on furnace operation. During each reversal cycle combustion air from a fan passing through one passage in the reversal valve enters the base of the regenerator on one side of the furnace and is preheated prior to entering the ports which connect to the furnace. Fuel in the form of oil and/or gas is injected either, under, over, through or side of port to produce a flame which is combusted in the glass melting furnace. The hot products of combustion exit the furnace through the opposing side port, down through the regenerator checker bricks releasing heat and then exiting to the exhaust stack through a second passageway in the reversal valve. As the air-side regenerator cools, the exhaust regenerator heats until the reversal valve reverses and combustion air enters the previously hot exhaust regenerator.

The glass is melted partly due to the radiation of the air-fuel flame but mainly from re-radiation from the roof and walls which are heated by the products of combustion. To obtain higher furnace glass production capacity, many furnaces use electric boost by means of electrodes immersed in the glass. This is costly and can cause damage to the glass contact tank walls. Through time, regenerators can start to block due to thermal/structural damage and/or carry-over of raw glass forming materials, also known as batch materials or batch, or condensation of volatile species released from the glass batch. As the regenerators start to block or fail, the preheat temperature of the air in the furnace will reduce. Because of the increased pressure drop, the exhaust side will limit the removal of exhaust gases and therefore limit energy input into the furnace thus reducing furnace glass production.

To recover production capacity lost to preceding regenerator issues or to increase production in a non-encumbered furnace, oxygen has been used by four means: general air enrichment with oxygen, specific oxygen lancing under the port flames, installation of an oxy-fuel burner between first port and charging end wall, and water-cooled oxy-fuel burners installed through the port. The capacity increases from these technologies is limited by access, process requirements or refractory temperature limits.

The End-Fired Regenerative furnace is similar in operation to a cross-fired furnace, however, has only two ports in the end wall which connect to individual regenerators. Regenerator deterioration is the same mechanism as in cross-fired furnaces and similarly electric and oxygen boost is utilized.

To recover production capacity lost to the aforementioned regenerator issues or to increase production, oxygen has been used by three means: general air enrichment with oxygen, specific oxygen lancing under the port and installation of oxy-fuel burners through the furnace side walls down tank. These technologies are typically limited on capacity because of location and concerns for overheating of the furnace.

The recuperative furnace utilizes at least one recuperator type heat exchanger. Unlike the regenerator, the recuperator is continuous with hot concurrent flow heat exchanger where exhaust gases preheat combustion air which is ducted to individual air fuel burners along the sides of the furnace. Recuperative furnaces can also use electric boost. As with regenerative furnaces, recuperators can start to lose their efficiency and ability to preheat the air. They can become blocked or develop holes.

To recover production capacity lost from the aforementioned recuperator issues or to increase production, oxygen has been used by three means: general air enrichment with oxygen, specific oxygen lancing under the air fuel burners and installation of oxy-fuel burners either through the furnace side or end walls. These technologies are typically limited on capacity because of location restrictions and concerns for overheating of the furnace.

Direct fired furnaces do not utilize preheated air and are therefore less efficient than the preceding examples of furnace design. To improve thermal efficiency or increase production capacity, side wall oxy-fuel burners have replaced air fuel burners.

Electric furnaces or furnaces which utilize electricity for majority of melting are typically costly to operate and are subject to a shorter campaign life than the typical fossil fuel furnaces. Once designed it is difficult to increase the production capacity. This invention relates to hot top and warm top electric furnaces and is not applied to cold top furnaces U.S. Pat. No. 5,139,558 to Lauwers discloses the use of a high-momentum roof-mounted auxiliary oxygen fired burner in a glass melting furnace which is directed to the interface of the melted and solid glass forming ingredients whereby the solid glass forming ingredients are mechanically prevented from escaping the melting zone.

U.S. Pat. No. 3,337,324 to Cable discloses a process for melting batch material in a glass furnace using a burner positioned to fire substantially down over the feed end of a water-cooled furnace.

Co-pending U.S. patent application Ser. No. 08/992,136 discloses the use of roof-mounted burners as the primary source of heat in a glass melting furnace having no regenerators or recuperators.

SUMMARY OF THE INVENTION

Briefly, according to this present invention, glass melting furnaces of all designs can be boosted using at least one roof-mounted oxygen fuel burners positioned over the raw batch materials as the materials enter the furnace to improve the rate of melting and improve glass quality and/or glass product yield. Because of the increased rate and yield of the glass melting generated by the design and positioning of these burners, depending on furnace condition and type, at least one or more of the following can be achieved: increased glass production, improved glass quality, reduction in electric boost, recovery of production lost due to inefficient heat recovery (i.e., blocked regenerators), reduction of oxygen use by replacing oxygen enrichment of the furnace atmosphere, reduction of oxygen use by replacing oxygen lancing, reduction of oxygen use by replacing conventional oxy-fuel burners positioned through the walls of a glass furnace, increased furnace campaign life, improved energy efficiency, reduction in emissions of oxides of nitrogen and oxides of sulfur, reduction in fossil fuel usage, reduction in cullet and increased product glass yield.

This invention may be applied to the following types of furnaces. In hot top electric furnace applications of this invention, at least one oxygen-fuel burner will be mounted in the roof of the furnace. In cross-fired regenerative furnace applications of this invention may necessitate at least one pair of the opposing ports to be fully or partially blocked or isolated. In end-fired regenerative furnace applications of this invention, at least one oxygen-fuel burner will be mounted in the roof of the furnace and the combustion air flow reduced by a portion of the original design maximum flow. In all recuperative furnace applications of this invention, at least one oxygen-fuel burner will be mounted in the roof of the furnace. In multi-burner furnaces, burners adjacent to the roof mounted burners should be removed and the air supply isolated. In single burner or single port applications the combustion air flow will be reduced by a portion of the original design maximum flow.

In all direct fired furnace applications of this invention, at least one oxygen-fuel burner will be mounted in the roof of the furnace. In multi-burner furnaces, burners adjacent to the roof mounted burners should be removed and the air supply discontinued. In single burner or single port applications, the combustion air flow will be reduced by a portion of the original design maximum flow.

In all the above cases the scope of the invention is effectively the same: glass melting which was previously performed by air-fuel or oxy-fuel including but not exclusive of furnaces that utilize electric boost or conventional oxygen boosting methods, is replaced by roof-mounted oxy-fuel burners positioned over the raw batch materials entering the furnace to improve the rate of melting and/or improve glass quality and/or glass product yield. Because of the ability to position these burners at specific locations, increased heat transfer to the unmelted raw batch materials is achieved.

In all cases at least one roof-mounted oxy-fuel burner is positioned over the raw batch materials entering the furnace to improve the rate of melting and improvement in quality is utilized and in all multi-port and multi-burner air fuel applications at least one pair of ports or pair of burners are isolated. In all single port and single burner applications the air and fuel are reduced to a portion below the maximum design. The more efficient roof mounted burners provide energy to replace the conventional energy removed from the process and the additional energy to achieve the desired process requirements. The positioning of the burners over the raw batch entering the furnace improves the rate of melting. The stoichiometric ratios and control of the roof-mounted burners and remaining air-fuel burners is critical to minimizing the emission of nitrous oxide and sulfur dioxide.

BRIEF DESCRIPTION OF THE DRAWINGS

Further features and other objects and advantages of this invention will become clear from the following detailed description made with reference to the drawings in which.

DETAILED DESCRIPTION OF THE INVENTION

Referring to the figures, there is shown a glass melting furnace 10 for providing molten glass to a glass forehearth or refiner 12 wherein the molten glass is further refined and subsequently fed to one or more glass-forming machines such as containers, fiberizers, float baths and the like (not shown). In considering the figures, it will be appreciated that for purposes of clarity certain details of construction are not provided in view of such details being conventional and well known by someone skilled in the art once the invention is disclosed and explained. Specific items excluded are the regenerator ports, air-fuel burners and exhausts since these are different for each type of furnace.

The glass melting furnace 10 typically includes an elongated channel having an upstream end wall 14 and a downstream end wall 16, side walls 18 a floor 20 and a roof 22 all made from appropriate refractory materials such as alumina, silica, alumina-silica, zircon, zirconia-alumina-silica chromeoxide and the like. The roof 22 is shown generally as having an arcuate shape transverse to the longitudinal axis of the channel, however, the roof may be of most any suitable design. The roof 22 of the typical glass melting furnace 10 is positioned between about 3–15 feet above the surface of the raw glass-forming material. As well known in the art, the glass melting furnace 10 may optionally include one or more bubblers 24 and/or electrical boost electrodes (not shown). The bubblers and/or electrical boost electrodes increase the temperature of the bulk glass and increase the molten glass circulation under the batch cover.

The glass melting furnace 10 includes two successive zones, a melting zone 27 and a downstream fining zone 28. The melting zone 27 is considered the upstream zone of the glass melting furnace 10 wherein raw glass-forming material is charged into the furnace using a charging device 32 of a type well known in the art. The raw glass-forming material 30 may be a mixture of raw materials typically used in the manufacture of glass. It will be appreciated that the composition of the raw glass-forming material (or batch) 30 is dependent on the type of glass being produced. Normally, the material comprises, inter alia, silica containing materials including scrap glass commonly referred to as cullet. Other glass-forming materials including feldspar, limestone, dolomite, soda ash, potash, borax and alumina may also be used. To alter the properties of the glass, a minor amount of arsenic, antimony, sulfates, carbon and/or fluorides may also be added. Moreover, color forming metal oxides may be added to obtain the desired color.

The raw glass-forming material 30 forms a batch layer of solid particles on the surface of the molten glass in the melting zone 27 of the glass melting furnace 10. The floating solid batch particles of raw glass-forming material 30 are melted principally by at least one oxygen-fuel burner 34 having a controlled impinging flame shape and length mounted within the roof 22 of the glass melting furnace 10. It will be appreciated that it has been found that the installation and proper control of at least one oxygen-fuel burner 34 in the roof 22 of the glass melting furnace 10 over the raw glass-forming material 30 in accordance with the present invention increases the melting rate of the solid raw glass-forming material and, at the same time, maintains the operating temperature of the surrounding refractory material within acceptable operating limits.

Figure 1:
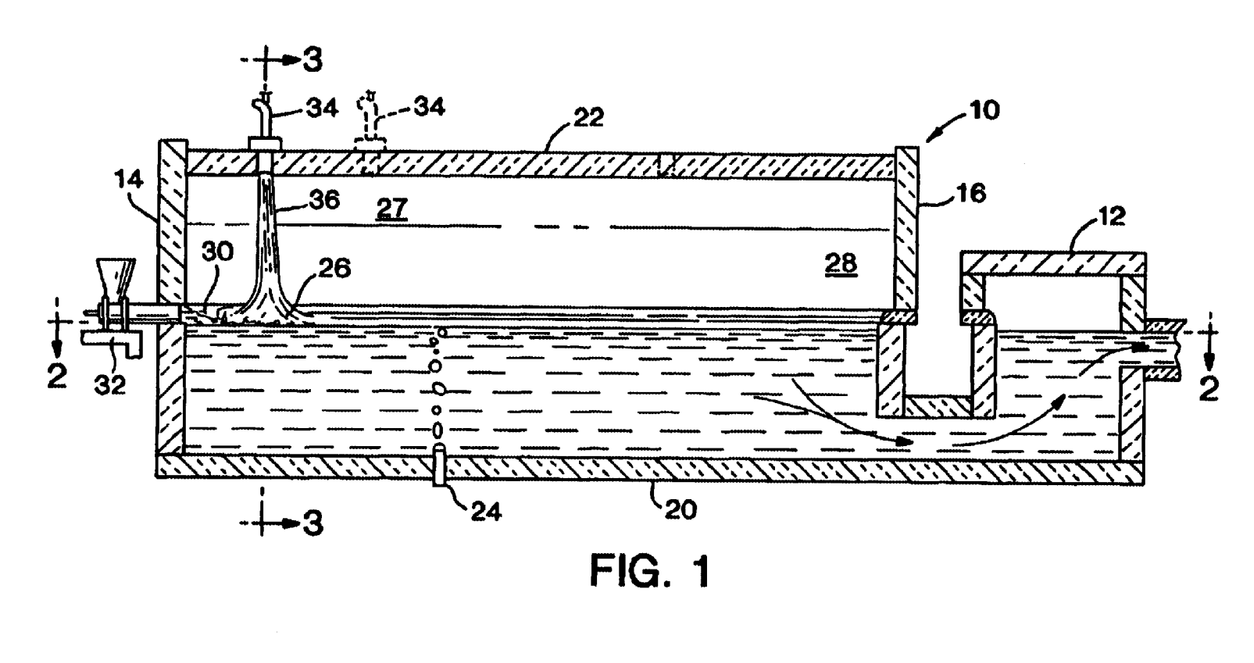
FIG. 1 is a cross sectional longitudinal view of a glass meting furnace in accordance with the present invention.
Figure 2A:
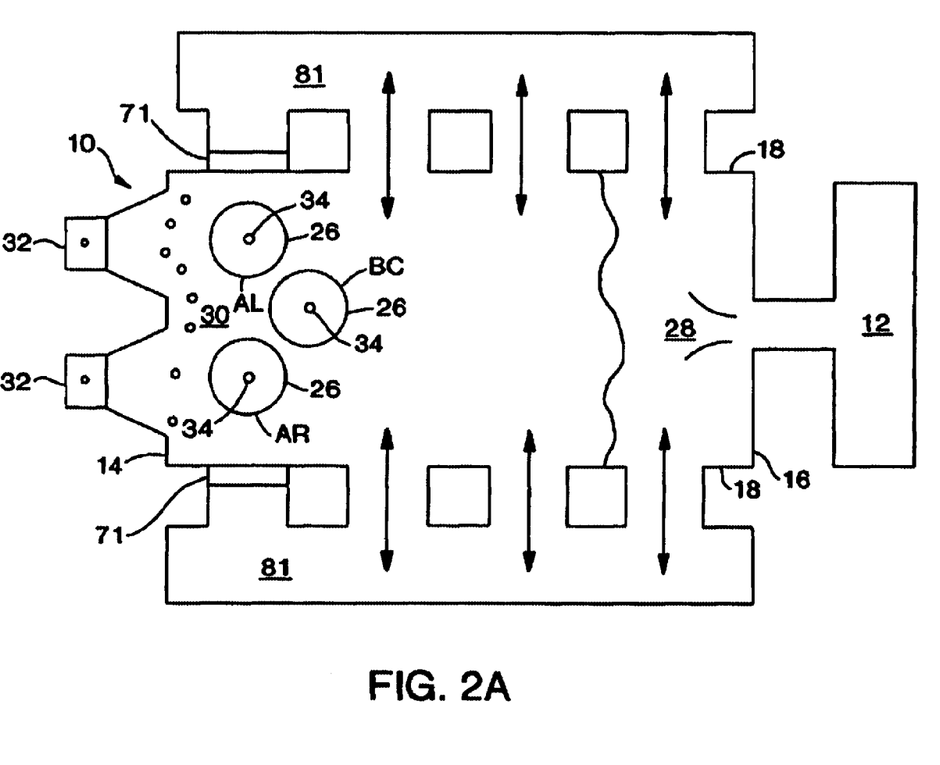
FIG. 2A is a cross-sectional plan view of a cross-fired regenerative embodiment of the glass melting furnace of FIG. 1 along line 2—2.
Figure 3:
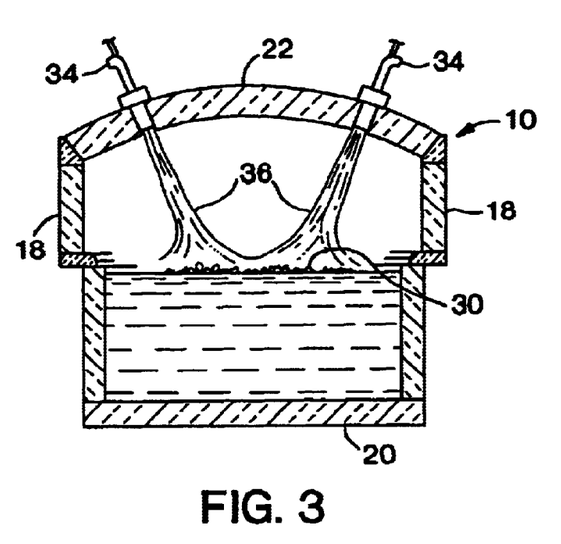
FIG. 3 is a cross sectional view of the glass melting furnace of FIG. 1 along line 3—3 illustrating two oxygen-fuel burners adjacent the upstream end wall of the furnace.
Figure 4:
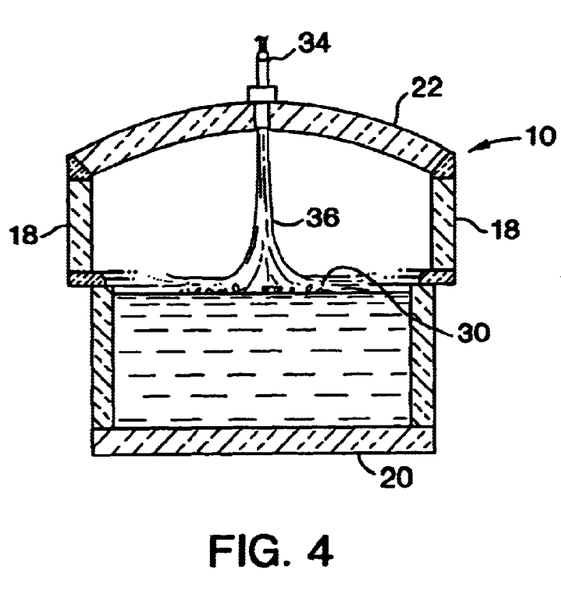
FIG. 4 is an alternate cross sectional view of the glass melting furnace of FIG. 1 along line 3—3 illustrating one oxygen-fuel burner adjacent the upstream end wall of the furnace.

As used herein, the phrase "at least one oxygen-fuel burner" means one or more oxygen fuel burners. Furthermore, as used herein the phrase "principally by at least one oxygen-fuel burner" refers to the condition wherein the additional or recovered glass production capacity and replaced air fuel and or electric/oxygen boost energy for melting of the raw glass-forming material is from at least one oxygen-fuel burner. In one particular embodiment, as shown in FIGS. 1 and 2A the glass melting furnace 10 includes three oxygen-fuel burners 34. A single oxygen-fuel burner 34 is positioned upstream of two adjacently positioned downstream oxygen fuel burners. However, it will be appreciated that any number of oxygen-fuel burners 34 may be positioned at almost any suitable location in the roof 22 of the furnace 10 over the batch to melt the raw glass-forming material 30. For example, two oxygen-fuel burners 34 may be positioned in a side-by-side relation as depicted in FIG. 3 or a single oxygen-fuel burner may be used as depicted in FIG. 4. Nonetheless, in accordance with the present invention, the angular orientation of each oxygen-fuel burner 34 in the roof 22 of the glass melting furnace must be such that the flame 36 produced is directed substantially perpendicular to the glass batch surface to produce a flame which impinges on the glass surface to form an impingement area 26. In a preferred embodiment, the oxygen-fuel burners 34 are positioned substantially perpendicular to the batch material at an angle of about 90 degrees relative to the raw glass-forming material 30. The angle may deviate from the perpendicular in the direction of the downstream end-wall by as much as 30 degrees, but preferably less than 10 degrees. It has been found that the glass production rate and the quality of glass produced may be improved by melting the raw glass-forming material 30 with at least one downwardly firing oxygen-fuel burner 34 having a controlled impinging flame shape and length in accordance with the present invention.

The at least one oxygen-fuel burner requires fuel and an oxidant. The fuel can be either gaseous or liquid or combinations of both. Gaseous fuels include natural gas (methane), towns gas, producer gas, LPG, propane, butane and blends of the aforementioned gases. Liquid fuels include heavy, medium and light fuel oils, kerosene and diesel. Liquid fuels require to be atomized and/or vaporized. The atomization can be either by mechanical means or a secondary atomizing mediums which include air, steam, oxygen, any of the aforementioned gaseous fuels and in some cases an inert gas. Vaporization relies on the heat of the surrounding products of combustion gases to evaporate the oil. The oxidant can be either 100% pure oxygen or a blend of oxygen and inert gas with an oxygen concentration 40–100%.

Figure 5:
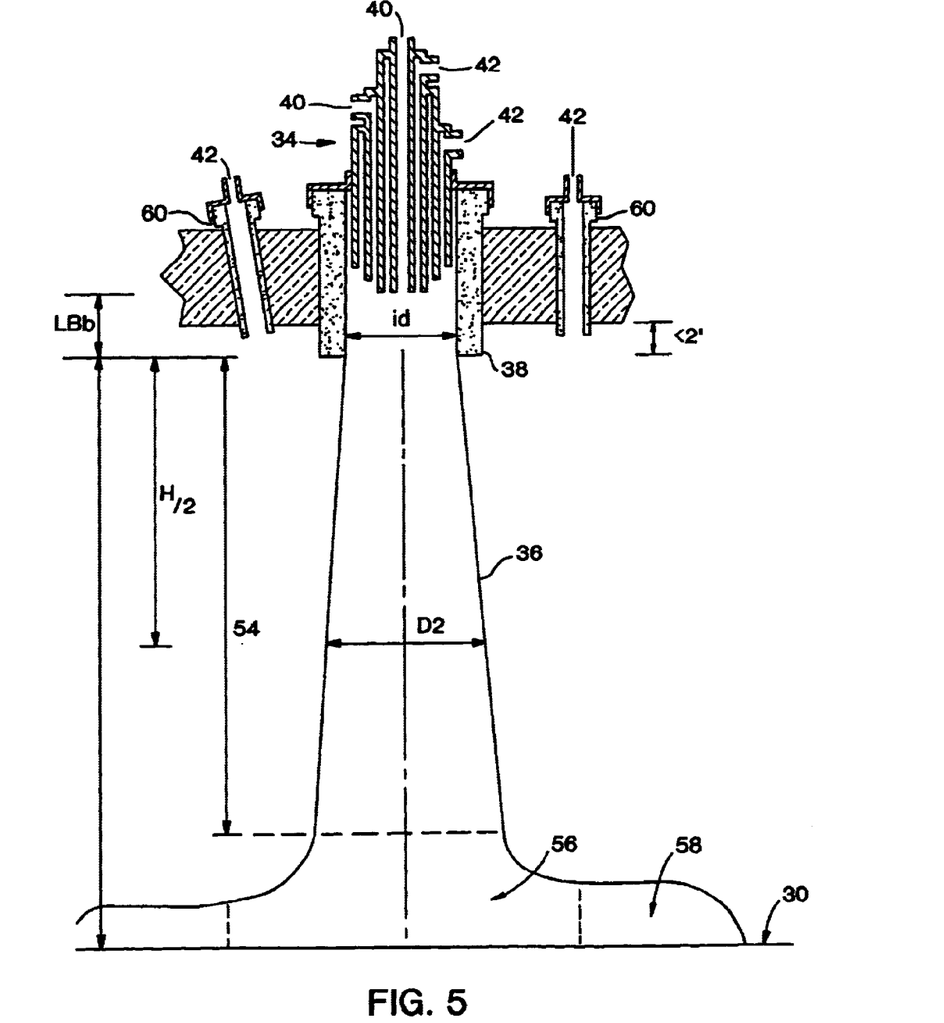
FIG. 5 is a cross sectional view of an oxygen fuel burner and a schematic representation of a burner flame from the oxygen burner.

Referring to FIG. 5, the at least one oxygen-fuel burner 34 within the roof 22 of the glass melting furnace 10 has at least one fuel conduit 40 for providing fuel and at least one oxygen conduit 42 for providing oxygen flow. The oxygen-fuel burner 34 may have a capacity ranging from about 1–15 MM Btu/hr depending upon the glass melting furnace 10 size and desired pull rate. The oxygen-fuel burner 34 is designed to use a higher percentage of oxygen than is present in air and thus the temperature above the area of impingement of the flame 36 from the oxygen-fuel burner 34 is substantially higher than in a conventional glass melting furnace utilizing air-fuel burners. Notwithstanding, as well known to one skilled in the art the temperature of the flame 36 imparted by an oxygen-fuel burner 34 is dependent on the quality of the fuel and the oxygen/fuel ratio. In a preferred embodiment, the oxygen concentration of the oxygen-fuel burner 34 is typically at a level of about 95–125 percent of the stoichiometric amount of oxygen required to combust the fuel. The fuel to oxygen ratio can be varied, however, to produce a range of operating conditions in the glass melting furnace 10 to effect one or more desired properties, including, for example, redox level, glass color, the level of gaseous bubbles known as seeds in the trade and other glass properties.

The oxygen-fuel burner 34 extends downwardly from a burner block 38 located in the roof 22 of the glass melting furnace 10. Each primary burner block 38 includes an opening having an inside diameter (id) which is at least as great as the external diameter of the largest conduit 42 or 40 dependent on configuration. The inside diameter (id) of the opening of the burner block 38 may range between about 2–8 inches. The end of the oxygen-fuel burner 34 primary combustion zone is located from the end of the burner block 38 a distance (LBb) between about 0–18 inches. The secondary and in some cases tertiary combustion zone is external to the burner block 38. It will be appreciated that the opening of the burner block 38 between the end of the oxygen-fuel burner 34 and the end of the burner block in some instances acts to focus the burner flame and prevent the burner flame from spreading outwardly but moreover protects the conduits of the burner. The burner block 38 is made of a refractory material as well known in the art and may be of most any suitable outside shape such as rectangular and the like.

The bottom surface of the burner block 38 may be flush with the inside surface of the roof 22 or the bottom surface may project below the inside surface of the roof to a maximum distance of 2 inches to protect the burner block 38 from wear. Furthermore, as shown in FIG. 5, the fuel conduits 40 and oxygen conduits 42 of the oxygen-fuel burner 34 extend downwards within the burner block 38 and terminate at either substantially the same vertical height or totally different vertical heights from the exit of burner block 38.

Dependent on height of burner block 38 from raw batch and desired operating conditions of the burner, the greater the fraction of fuel staging and oxygen staging internal and external to the burner block 38 will vary. Additional oxygen injectors 60 are positioned to delay complete combustion until after the flame has impinged on the raw batch. The location of these additional injectors 60 is dependent on number and position of roof mounted burners however can be located in any point of the roof and walls.

In accordance with the present invention, the downwardly directed impinging flame 36 produced by the at least one oxygen-fuel burner 34 is precisely controlled to give a flame length greater than or equal to the distance from the exit of burner block 38 to the surface of the raw glass-forming ingredients 30 and the surface of the molten glass and away from the surrounding refractory thereby reducing the risk of overheating the roof 22 and side walls 18 of the glass melting furnace 10. The impinging flame 36 may be controlled by such control devices as are conventional and standard in chemical processing. For example, valves, thermocouples, thermistors coupled with suitable servo circuits, heater controllers and the like are readily available and conventionally used for controlling the quantity and velocity of the fuel and oxygen from the oxygen-fuel burner 34.

The impinging flame 36 is precisely controlled by controlling both the relative velocity and the maximum and minimum velocities of the fuel and of the oxygen streams and the internal and external staging from the at least one oxygen-fuel burner 34.

The maximum and minimum velocity of the fuel and oxygen flow impinging on the surface of the raw glass-forming material 30 must be controlled to prevent the disturbance of the batch material and entrainment of or the displacement of glass batch material against the side walls 18 and roof 22 while maintaining optimum convective heat transfer to the surface of the raw glass-forming material. It will be appreciated that the displacement of glass batch material against the side walls 18 and roof 22 will adversely effect the refractory material and possibly shorten the operating life of the glass melting furnace 10.

In order to determine the proper maximum velocity for the fuel and oxygen flow a burner was vertically mounted and fired downwards into a bed of glass sand across which grooves had been made. While the burner was adjusted to different heights from the sand and burner retractions into the block (LBb) the firing rates at which sand movement was discerned was noted. The data from these experiments was compared against simulations run on a commercially available computational fluid dynamics code thus yielding a maximum velocity across the surface above which sand would be disturbed in the aforementioned experiments.

TABLE 1

Maximum. Burner Firing Rates (MMBtu/Hour)

| L(Bb) | Height (feet) | | | |
|---|---|---|---|---|
| | 5 ft | 6 ft | 7 ft | 8 ft |
| 13 | 3.9 | 4.4 | 5.4 | 6.2 |
| 11.5 | 4.9 | 5.0 | 6.2 | 6.8 |
| 9 | 5.5 | 6.1 | 6.4 | 7.1 |
| 6.5 | 6.4 | 7.2 | 7.4 | 8.1 |
| 4 | 6.9 | 8.8 | 8.3 | 9.1 |

From these experiments the maximum surface velocity was ascertained by comparison with the CFD models to be approximately 21 m/s. Due to variations in batch material, batch glazing and batch particle cohesion the exact maximum may differ from the above calculated maximum, therefore, it should be possible for one skilled in the art to vary the maximum velocity up to approximately 25 m/sec. To minimize disturbance and entrainment of the batch material, however, the maximum velocity should be kept below 30 m/sec.

The maximum and minimum velocity of the fuel and of the oxygen of the oxygen-fuel burner 34 are also controlled to harness the maximum energy from the impinging flame 36 without damaging the surrounding refractory material. The maximum energy from the impinging flame 36 is achieved by minimizing the amount of heat released to the glass melting furnace 10 combustion space and maximizing the heat transfer to the raw-glass forming material 30. The operational maximum and minimum velocity range for the oxygen-fuel burner 34 to generate an acceptable heat transfer rate to the raw glass-forming material 30 without damaging the refractory material furnace walls and superstructure is a function of the design and location of the oxygen-fuel burner, burner block opening geometry, the velocities of the fuel and oxygen from the oxygen-fuel burner 34, burner staging, interaction of adjacent oxygen-fuel burners, fuel burners and furnace exhaust.

The second region, the stagnation region 56, is the region where the flame 36 penetrates the thermal boundary layer and impinges upon the surface of the raw glass-forming material 30. Within this region 56, the flame 36 penetrates the thermal boundary layer and impinges on the surface of the raw glass-forming material building a sharp pressure gradient at the surface that accelerates the horizontal flow of the deflected flame causing the flame to spread outwardly radially along the impinged surface. The end of the stagnation region 56 is defined as the location on the surface of the raw glass-forming material where the pressure gradient generated by the impinging flame 36 drops to zero. Within the stagnation region 56, by carefully controlling the momentum of flame 36, the thermal boundary layer that naturally exists at the surface of the raw glass-forming material 30 is penetrated and eliminated and thus its strong heat resistive features are attenuated. Accordingly, the heat generated by the impinging flame 36 penetrates more easily into the partially melted raw glass-forming material 30. Furthermore, within the stagnation region 56 the flame 36 luminosity significantly increases which enhances the radiation heat transfer into the relatively colder raw glass-forming material 30.

At the radial limits of the stagnation region 56 the wall jet region 58 begins. In this region, the flame 36 flows essentially parallel to the impinged surface and the thermal boundary layer grows along the impingement surface and outward from the stagnation region 56, thus the thermal boundary layer starts to build up restoring the surface resistance to the heat flow into the raw glass-forming material surface.

The controlled flame heat generation in the free-jet region 54 is the result of the design of the oxygen-fuel burner 34, inside diameter of the opening (id) of the burner block 38 and both the relative velocities and maximum and minimum velocities of the oxygen and fuel streams. By selectively controlling the design of the oxygen-fuel burner 34, the burner block 38 geometrical design and the velocities of the oxygen and fuel streams a reduced shear stress between the oxygen and gas streams is produced providing controlled partial combustion and reduced thermal radiation emissions. It will be appreciated that by optimizing burner design and operation of the oxygen-fuel burner 34, the flame heat generated in the free jet region 54 and the heat transfer resistance at the raw glass surface in the stagnation region 56 are minimized thereby maximizing the heat generated in the stagnation region.

The heat generated in the free-jet region 54 is the result of the following processes. First, the controlled partial combustion in the free-jet region 54 permits controlled combustion at the surface of the raw glass-forming material 30 thereby bringing the combustion process proximate to the surface of the raw glass-forming material. Bringing the combustion process proximate the surface of the raw glass-forming material 30 generates an elevated temperature gradient at the surface of the raw glass-forming material thereby improving the convection heat transfer. Second, the controlled partial combustion in the free-jet region 54 generates an acceptable temperature for the chemical dissociation of the combustion gases and the products of combustion. These dissociated species, once impinged on the relatively colder surface of the raw glass-forming material 30, partially recombine, exothermically, generating significant heat at the surface of the raw glass-forming material. The heat from the exothermic reactions further augments the convective heat transfer process. The minimization of the heat resistance at the stagnation region 56 of the surface of the raw glass-forming material 30 is the result of the following factors.

First, the thermal boundary layer is eliminated through the controlled flame 36 momentum and the turbulence generated by the carefully controlled combustion characteristics at the surface of the raw glass-forming material 30. Second, the localized surface heat generation allows for the conversion of the low thermal conductive raw glass-forming material 30 into a significantly better conductive molten glass material. This conversion allows for the heat generated at the surface to penetrate more efficiently into the raw glass-forming material depth.

In the cross-fired regenerative furnace FIG. 2A with regenerators 81 the preferred embodiment of the present invention utilizes at least one crown mounted burner 34 positioned over the raw batch materials entering the furnace to improve the rate of melting and improvement in quality to recover or boost production capacity or reduce electric boost capacity. Crown-mounted burner 34 impinges the surface of the batch material 30 in impingement area 26. In all cross-fired regenerative furnace applications of this invention at least one pair of the opposing ports 71 will be fully or partially blocked or isolated. This will typically be the first port and perhaps the second port dependent on the amount of boost required. Additional roof-mounted burners can be located down the glass tank provided the crown mounted burners are positioned over the unmelted batch materials. The energy deliberated from the crown mounted burners replaces energy removed from the previously firing ports, the removed conventional electric or oxy-boost.

Figure 2B:
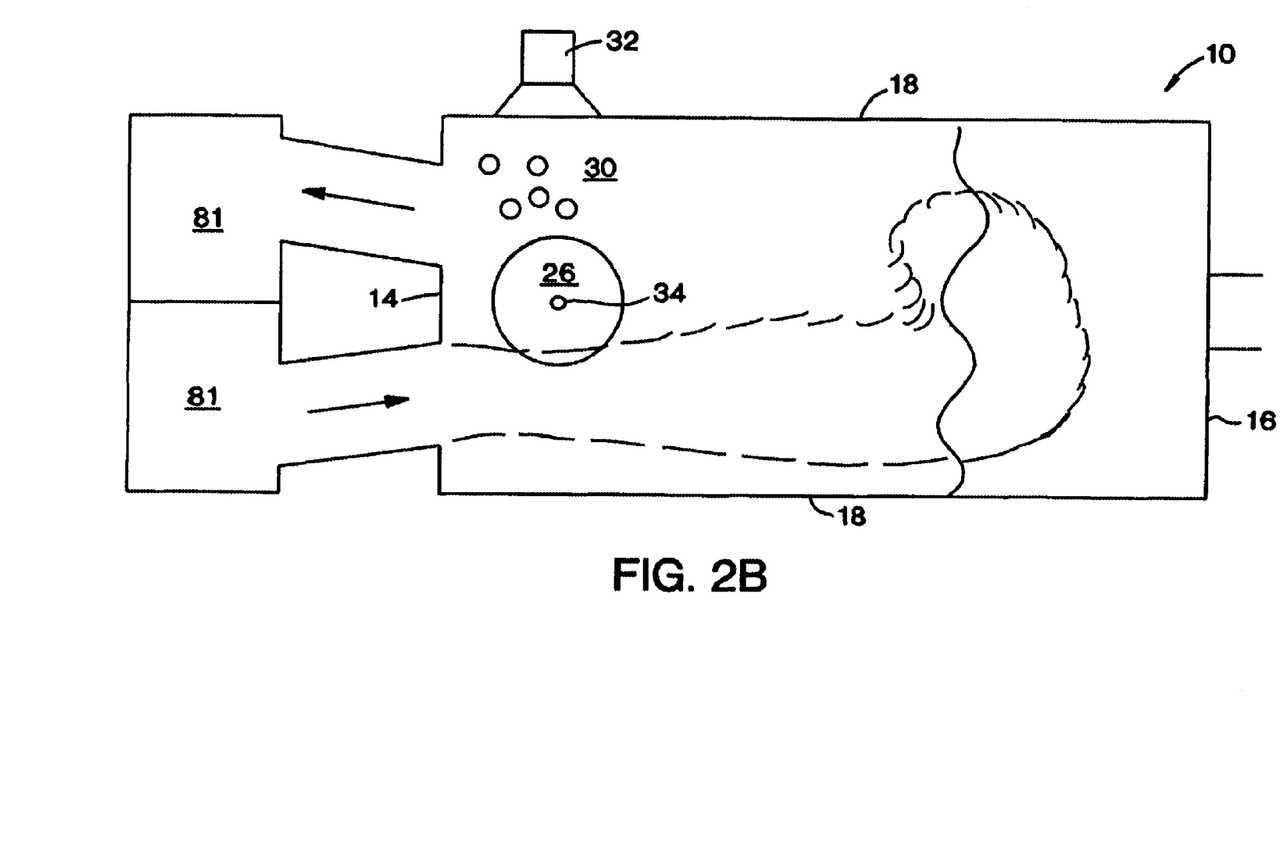
FIG. 2B is a cross-sectional plan view of an end-fired regenerative embodiment of the glass melting furnace of FIG. 1 along line 2—2.

In the end-fired regenerative furnace of FIG. 2B with regenerators 81 the preferred embodiment of the present invention utilizes at least one crown mounted burners 34 positioned over the raw batch materials entering the furnace to improve the rate of melting and improvement in quality to recover or boost production capacity or reduce electric boost capacity. In all end-fired regenerative furnace applications of this invention the combustion air and conventional fuel requirements will be reduced from the previous design and replaced with energy from the at least one crown mounted burners 34 positioned over the raw batch materials and impinging the batch materials in impingement area 26. Additional roof-mounted burners can be located down the glass tank provided the crown mounted burners are positioned over the unmelted batch materials. The energy deliberated from the crown mounted burners replaces energy reduced from the firing port, the removed conventional electric or oxy-boost.

Figure 2C:
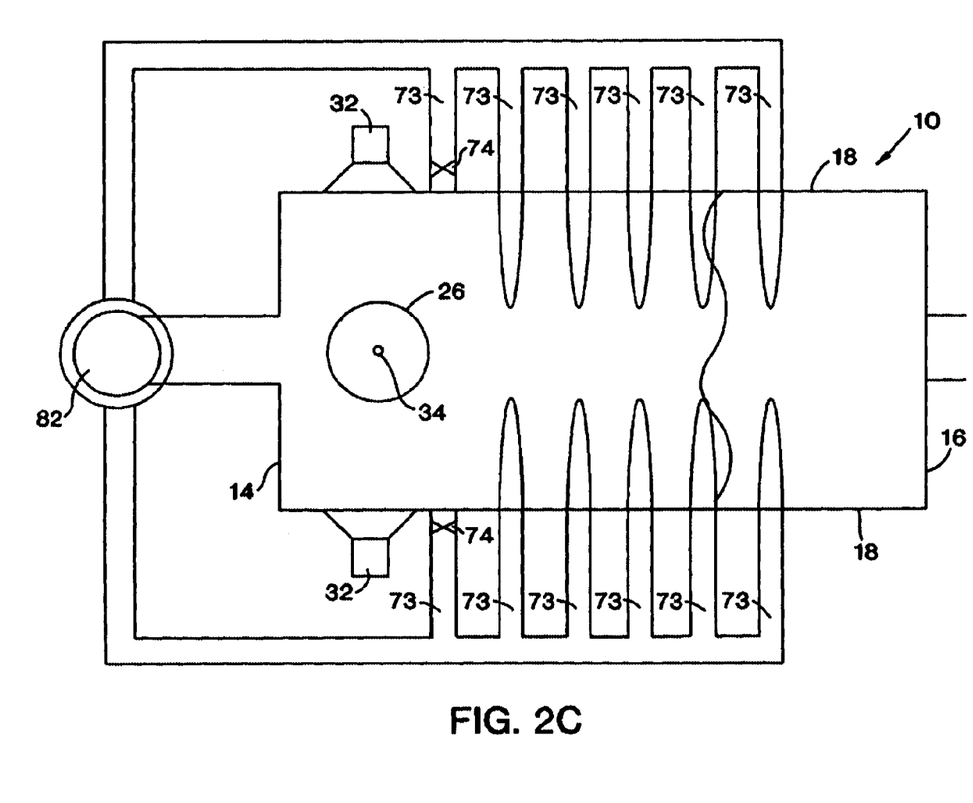
FIG. 2C is a cross-sectional plan view of a cross-fired recuperative embodiment of the glass melting furnace of FIG. 1 along line 2—2.

In the cross-fired recuperative furnace of FIG. 2C with recuperator 82 the preferred embodiment of the present invention utilizes at least one roof mounted burner 34 positioned over the raw batch materials entering the furnace to improve the rate of melting and improvement in quality to recover or boost production capacity or reduce electric boost capacity. In all cross-fired recuperative furnace applications of this invention at least one pair of the opposing burners 73 will be fully or partially blocked or isolated using a block 74. This will typically be the first zone of burners and perhaps the second zone dependent on the amount of boost required. Additional roof-mounted burners can be located down the glass tank provided the crown mounted burners are positioned over the unmelted batch materials. The energy deliberated from the crown mounted burners replaces energy removed from the previously firing ports, the removed conventional electric or oxy-boost.

Figure 2D:
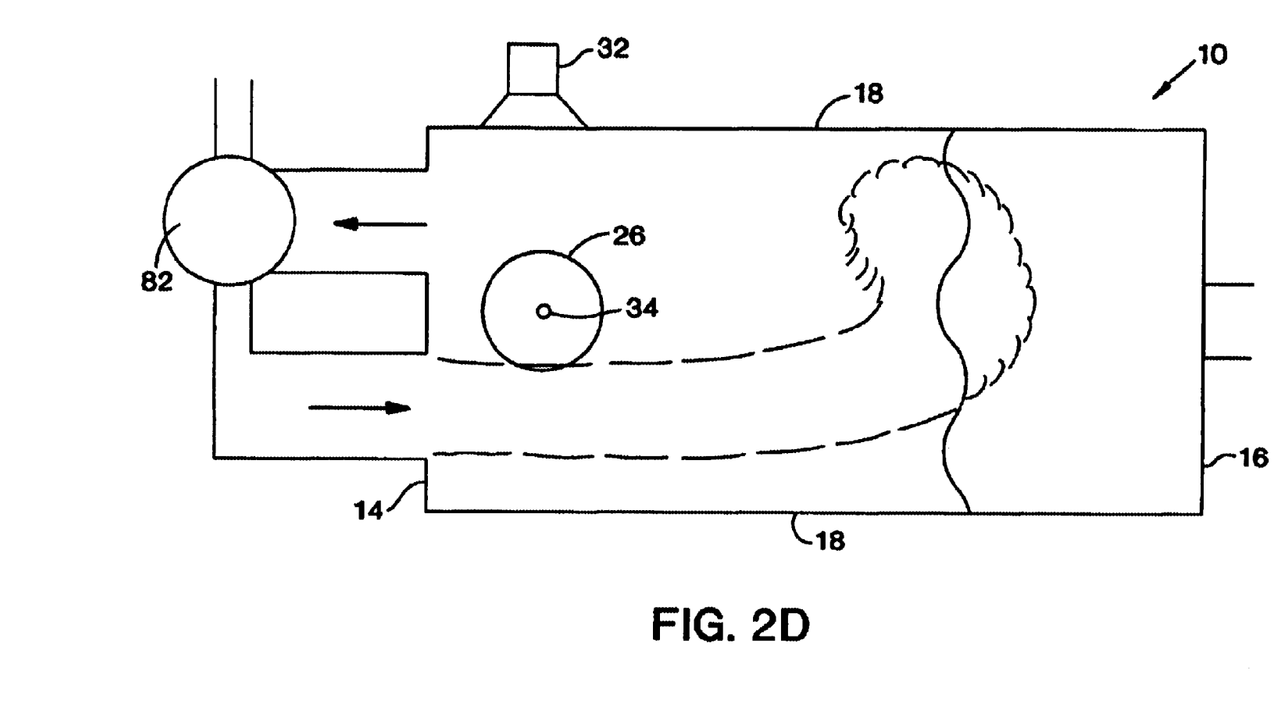
FIG. 2D is a cross-sectional plan view of an end-fired recuperative embodiment of the glass melting furnace of FIG. 1 along lines 2—2.

In the end-fired recuperative furnace of FIG. 2D with recuperator 82 the preferred embodiment of the present invention utilizes at least one crown mounted burner 34 positioned over the raw batch materials entering the furnace to improve the rate of melting and improvement in quality to recover or boost production capacity or reduce electric boost capacity. In all end-fired recuperative furnace applications of this invention the combustion air and conventional fuel requirements will be reduced from the previous design and replaced with energy from the at least one crown mounted burner 34 positioned over the raw batch materials. Additional roof-mounted burners can be located down the glass tank provided the crown mounted burners are positioned over the unmelted batch materials. The energy deliberated from the crown mounted burners replaces energy reduced from the firing port, the removed conventional electric or oxy-boost.

Figure 2E:
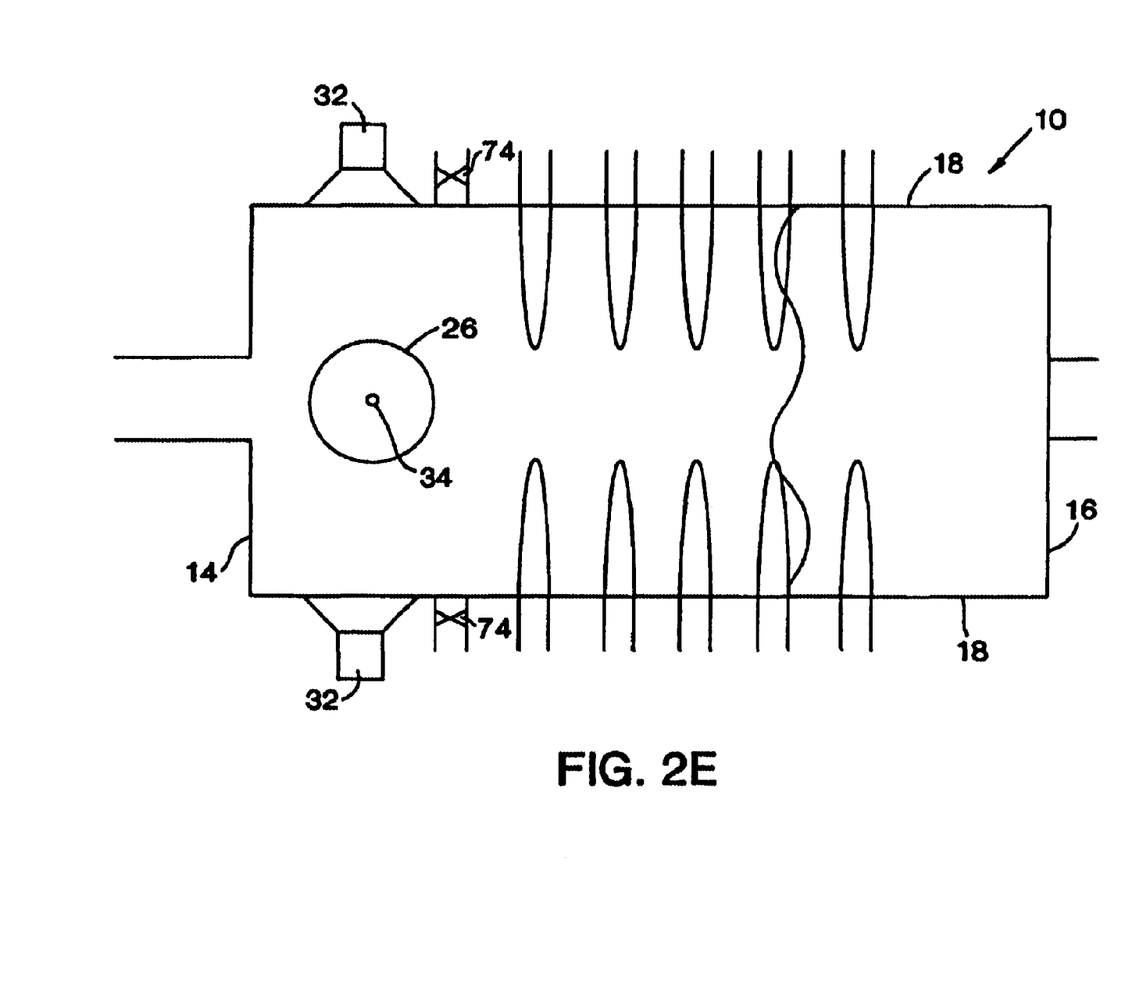
FIG. 2E is a cross-sectional plan view of a unit melter embodiment of the glass melting furnace of FIG. 1 along lines 2—2.

In the direct-fired furnace of FIG. 2E The preferred embodiment of the present invention utilizes at least one crown mounted burners positioned over the raw batch materials entering the furnace to improve the rate of melting and improvement in quality to recover or boost production capacity or reduce electric boost capacity. In all direct fired furnace applications of this invention the combustion air and conventional fuel requirements will be reduced from the previous design and replaced with energy from the at least one crown mounted burners positioned over the raw batch materials. In multi-air-fuel-burner 73 applications at least one burner 74 will be isolated. Additional roof-mounted burners can be located down the glass tank provided the crown mounted burners are positioned over the unmelted batch materials. The energy deliberated from the crown mounted burners replaces energy reduced from the firing port, the removed conventional electric or oxy-boost.

In an electric hot top furnace the preferred embodiment of the present invention utilizes at least one crown mounted burners positioned over the raw batch materials entering the furnace to improve the rate of melting and improvement in quality to recover or boost production capacity or reduce electric boost capacity. Additional roof-mounted burners can be located down the glass tank provided the crown mounted burners are positioned over the unmelted batch materials. The energy deliberated from the crown mounted burners replaces energy reduced from the firing port, the removed conventional electric or oxy-boost.

In all cases nitrogen oxides and sulfur dioxide can be reduced by the careful selection of stoichiometric ratio of the different roof-mounted burners and remaining air fuel burners. Referring to FIG. 2A as an example in the cross-fired furnace application., the burners 34 mounted in the AL or AR positions are operated with excess stoichiometric oxygen to create a fuel lean (oxidizing) zone in the furnace. By operating either burner 34 at position BC and or burners at the second port 71 with less than stoichiometric oxygen or air creates a fuel rich (reducing) zone in the furnace. The remaining ports are operated with excess stoichiometric oxygen to create a fuel lean (oxidizing) zone in the furnace. This rich-lean-rich configuration effectively stages the combustion zones of the furnace to optimize heat transfer and minimize nitrogen oxide formation by creating a carbon monoxide screen.

The at least one roof mounted oxygen-fuel burner 34 may be either placed in a new air-fuel glass melter furnace 10 or retrofitted into an existing air-fuel glass melter furnace to increase the glass quality relative to an air-fuel only fired furnace. It will be appreciated that the present invention facilitates a substantial pull rate increase, reduction in glass melting furnace 10 wall temperature and improved glass quality as compared to the same air-fuel furnace that is not retrofitted with at least one roof mounted oxygen-fuel burner as described herein. Furthermore, as will be readily appreciated by one skilled in the art, the use of at least one oxygen-fuel burner as opposed to an all air-fuel system appreciably reduces $NO_x$ emissions.

One demonstration of this invention was the oxygen boosting, 100% oxygen conversion, re-conversion to oxygen boost and finally conventional air fuel firing of an existing hot 3-port cross-fired regenerative furnace. The furnace was initially firing all air fuel. Port#1 firing was replaced with at least one roof mounted oxygen fuel burner. The furnace fired conventionally air fuel regenerative on remaining two ports. Port#2 firing was replaced with at least one roof mounted air fuel burner and the furnace fired conventionally air fuel regenerative on the third port. Port#3 firing was replaced with energy in the already installed roof-mounted oxy-fuel burners. The furnace capacity was increased from 55 to 85 tons per day with reduced energy input from 23.5 mmBTU/hr to 18 mmBTU/hr. The furnace was re-converted to air fuel firing in incremental stages. This example demonstrates the ability to selectively boost an existing air fuel furnace. The process does not require water-cooled burners.

The patents and documents described herein are hereby incorporated by reference.

Although the invention has been described in detail with reference to certain specific embodiments, those skilled in the art will recognize that there are other embodiments within the spirit and scope of the claims.

We claim:

1. A process for melting glass forming material in a furnace having a roof, a charging end, a melting zone adjacent the charging end, a fining zone downstream of the melting zone, and an end for providing molten glass adjacent the fining zone; wherein the glass forming material is introduced into the melting zone and is melted by at least one roof-mounted oxy-fuel burner positioned over the glass forming material entering the furnace, travels from the melting zone to the fining zone and is provided as molten glass from the fining zone; and combustion energy is provided over both the melting zone and the fining zone; said process including:

(i) providing the combustion energy over the melting zone principally by oxy-fuel combustion; and
   (ii) providing the combustion energy over the fining zone by air-fuel combustion.

2. The process of claim 1 including providing molten glass from the molten glass providing end to a glass forehearth or a refiner.

3. The process of claim 1, wherein air for the air-fuel combustion is preheated by heat recovery means having an exhaust.

4. The process of claim 1, including creating a carbon monoxide screen to minimize nitrogen oxide formation.

5. The process of claim 1, including providing the oxy-fuel combustion by a plurality of oxy-fuel burners and operating at least one of the oxy-fuel burners with less than stoichiometric oxygen adjacent to the air-fuel combustion zone.

6. The process of claim 1, including providing the oxy-fuel combustion by a plurality of oxy-fuel burners, and wherein the oxygen concentration of at least one of the oxy-fuel burners is at a level of about 95 to about 125 percent of the stoichiometric amount of oxygen required to combust fuel.

7. The process of claim 1, wherein the oxy-fuel combustion is provided by at least one oxy-fuel burner in a burner block with oxygen staging, and at least a fraction of the oxygen for the at least one oxy-fuel burner with oxygen staging is directed internally through the burner block.

8. The process of claim 1, wherein a flame generated from the oxy-fuel combustion is directed toward the glass forming material at an angle up to 30 degrees in the direction of the molten glass providing end.

9. The process of claim 1, including enriching air for the air-fuel combustion with oxygen.

10. The process of claim 9, including introducing oxygen to a flame generated from the air-fuel combustion by oxygen lancing.

11. The process of claim 1, wherein said furnace includes a roof positioned about 3 feet to about 15 feet above the surface of the glass-forming material.

12. The process of claim 11 including injecting oxygen gas proximate to the furnace roof.

13. A method of melting batch material in a glass furnace including a roof, an upstream melting zone and a downstream fining zone, the method comprising:

providing at least one oxy-fuel burner positioned at the roof in said furnace over said batch material as the batch material enters the furnace in the melting zone;
   providing at least one air-fuel burner in said furnace in the downstream fining zone,
   generating a flame from said at least one oxy-fuel burner in the melting zone, whereby the batch material is melted principally by said at least one oxy-fuel burner; and, generating a flame from said at least one air-fuel burner in the downstream fining zone.

14. The method of claim 13, wherein said furnace has at least one of a recuperator and a regenerator, including preheating combustion air for said at least one air-fuel burner.

15. The method of claim 13, including controlling the flame from said at least one oxy-fuel burner by at least one of internal and external staging.

16. A process for glass production in a glass furnace having a roof, a melting zone, and a downstream fining zone comprising:

charging raw glass batch materials into the furnace melting zone;

providing at least one oxy-fuel burner positioned at the roof over the raw glass batch materials as the raw glass batch materials are charged into the furnace;

melting said raw batch material principally by energy from the at least one oxy-fuel burner provided over said material; and providing energy to the furnace fining zone by firing at least one air-fuel burner in the furnace downstream of the melting zone.

17. The process of claim 16, wherein said furnace has at least one of a recuperator and a regenerator, including preheating combustion air for said at least one air-fuel burner.

18. The process of claim 16, including controlling the stoichiometric ratios of the at least one roof positioned oxy-fuel burner and the at least one air-fuel burner to minimize nitrogen oxides emissions.

* * * * *